United States Patent
Cerf et al.

(10) Patent No.: US 7,403,623 B2
(45) Date of Patent: Jul. 22, 2008

(54) HIGH-RATE QUANTUM KEY DISTRIBUTION SCHEME RELYING ON CONTINUOUSLY PHASE AND AMPLITUDE-MODULATED COHERENT LIGHT PULSES

(75) Inventors: Nicolas Cerf, Brussels (BE); Rosa Brouri-Tualle, Antony (FR); Philippe Grangier, Saint Rémy les Chevreuse (FR); Frédéric Grosshans, Paris (FR); Gilles Van Assche, Brussels (BE); Jérôme Wenger, Andlau (FR)

(73) Assignees: Universite Libre de Bruxelles (BE); Centre National de la Recherche Scientifique (FR)

( * ) Notice: Subject to any disclaimer, the term of this patent is extended or adjusted under 35 U.S.C. 154(b) by 371 days.

(21) Appl. No.: 10/615,490

(22) Filed: Jul. 7, 2003

(65) Prior Publication Data

US 2004/0109564 A1    Jun. 10, 2004

Related U.S. Application Data

(60) Provisional application No. 60/394,330, filed on Jul. 5, 2002.

(51) Int. Cl.
*H04K 1/00*    (2006.01)
*H04L 9/00*    (2006.01)

(52) U.S. Cl. .................. 380/278; 380/256; 359/238

(58) Field of Classification Search ............... 380/256, 380/263, 270, 278, 277; 398/40; 359/238
See application file for complete search history.

(56) References Cited

U.S. PATENT DOCUMENTS 5,307,410 A * 4/1994 Bennett ................ 380/256
5,339,182 A * 8/1994 Kimble et al. ............ 398/158
5,515,438 A * 5/1996 Bennett et al. ............ 380/278
5,675,648 A * 10/1997 Townsend .................. 380/278
5,757,912 A * 5/1998 Blow ........................ 380/256
5,764,765 A * 6/1998 Phoenix et al. ............ 380/283

(Continued)

OTHER PUBLICATIONS

Namiki et al. "Practical Limitation for Continuous-Variable Quantum Cryptography using Coherent States", The American Physical Society, Physical Review Letters, vol. 92, No. 11, Mar. 16, 2004. pp. 117901-1 to 117901-4.*
Gisin, N., Ribordy, G., Tittel, W. & Zbinden H., *Rev. Mod. Phys.* 74, 145 (2002).
Hillery, M., Quantum cryptography with squeezed states, *Phys. Rev. A* 61, 022309-1-022309-8 (2000).

(Continued)

*Primary Examiner*—Emmanuel L Moise
*Assistant Examiner*—Zachary A Davis
(74) *Attorney, Agent, or Firm*—Knobbe Martens Olson & Bear LLP

(57) ABSTRACT

One aspect of the present invention is related to a quantum cryptographic scheme comprising at least one sending unit including a physical means of encoding and distributing a raw key in the quadrature components of quantum coherent states that are continuously modulated in phase and amplitude, at least one receiving unit containing a physical means of performing homodyne detection of the quantum coherent states in order to measure the quadrature components of the states, a quantum channel for connecting the sending unit to the receiving unit, a two-way authenticated public channel for transmitting non-secret messages between the sending unit and the receiving unit, a quantum key distribution protocol ensuring that the information tapped by a potential eavesdropper can be estimated from the quantum channel parameters, and a direct or reverse reconciliation protocol that converts the raw continuous data into a common binary key.

28 Claims, 4 Drawing Sheets

U.S. PATENT DOCUMENTS

| | | | |
|---|---|---|---|
| 5,768,378 A * | 6/1998 | Townsend et al. | 380/256 |
| 5,953,421 A * | 9/1999 | Townsend | 380/283 |
| 5,999,285 A * | 12/1999 | Brandt et al. | 398/212 |
| 6,272,224 B1 * | 8/2001 | Mazourenko et al. | 380/283 |
| 6,289,104 B1 * | 9/2001 | Patterson et al. | 380/283 |
| 6,438,234 B1 * | 8/2002 | Gisin et al. | 380/256 |
| 6,522,749 B2 * | 2/2003 | Wang | 380/263 |
| 6,529,601 B1 * | 3/2003 | Townsend | 380/256 |
| 6,678,379 B1 * | 1/2004 | Mayers et al. | 380/278 |
| 6,778,669 B1 * | 8/2004 | Lehureau | 380/256 |
| 6,801,626 B1 * | 10/2004 | Nambu | 380/256 |
| 7,266,303 B2 * | 9/2007 | Linden et al. | 398/140 |
| 2002/0041687 A1 * | 4/2002 | Parks et al. | 380/263 |
| 2002/0106084 A1 * | 8/2002 | Azuma et al. | 380/263 |
| 2003/0002674 A1 * | 1/2003 | Nambu et al. | 380/256 |
| 2004/0141618 A1 * | 7/2004 | Lo et al. | 380/278 |

OTHER PUBLICATIONS

Ralph, T. C., Continuous variable quantum cryptography, *Phys. Rev. A* 61, 010303(R)-1-010303-4 (1999).

Ralph, T. C., Security of continuous-variable quantum cryptography., *Phys. Rev. A* 62, 062306-1-062306-7 (2000).

Reid, M. D., Quantum cryptography with a predetermined key, using continuous-variable Einstein-Podolsky-Rosen correlations, *Phys. Rev. A* 62, 062308-1-062308-6 (2000).

Gottesman, D. & Preskill, J., Secure quantum key distribution using squeezed states, *Phys. Rev. A* 63, 022309-1-022309-18 (2001).

Cerf, N. J., Lévy, M. & Van Assche, G. Quantum distribution of gaussian keys using squeezed states, *Phys. Rev. A* 63, 052311-1-052311-5 (2001).

Bencheikh, K., Symul, Th., Jankovic, A. & Levenson, J.A., Quantum key distribution with continuous variables, *J. Mod. Optics* 48, 1903-1920 (2001).

Cerf, N.J., Iblisdir, S. & Van Assche, G., Cloning and cryptography with quantum continuous variables, *Eur. Phys. J. D* 18, 211-218 (2002).

Silberhorn, Ch., Korolkova, N. & Leuchs, G., Quantum key distribution with bright entangled beams, *Phys. Rev. Lett.* 88, 167902-1-167902-4 (2002).

Grosshans, F. & Grangier, Ph., Continuous variable quantum cryptography using coherent states, *Phys. Rev. Lett.* 88, 057902-1-057902-4 (2002).

Cerf, N.J., Ipe, A. & Rottenberg, X., Cloning of continuous variables, *Phys. Rev. Lett.* 85, 1754-1757 (2000).

Cerf, N.J. & Iblisdir, S, Optimal N-to-M cloning of conjugate quantum variables, *Phys. Rev. A* 62, 040301(R)-1-040301-3 (2000).

Grosshans, F. & Grangier, Ph, Quantum cloning and teleportation criteria for continuous quantum variables, *Phys. Rev. A* 64, 010301(R)-1-010301-4 (2001).

Duan, L.-M., Giedke, G., Cirac, J. I. & Zoller, P., Entanglement purification of gaussian continuous variable quantum states, *Phys. Rev. Lett.* 84, 4002-4005 (2000).

Poizat, J.Ph., Roch, J.-F. & Grangier, P., Characterization on quantum non-demolition measurements in optics, *Ann. Phys.* (Paris) 19, 265-297 (1994).

Grangier, Ph., Levenson, J. A. & Poizat, J.-Ph., Quantum non-demolition measurements in optics, *Nature* 396, 537-542 (1998).

Grosshans, F. & Grangier, Ph., Reverse reconciliation protocols for quantum cryptography with continuous variables, *E-print arXiv:quant-ph*/0204127-1-0204127-5 (Apr. 2002).

Bennett, C.H. & Brassard, G., Quantum cryptography: Public key distribution and coin tossing, *Proceedings of the IEEE International Conference on Computers, Systems, and Signal Processing*, Bangalore, India, 175-179 (IEEE, New York, 1984).

Brassard, G. & Salvail, L., Secret-key reconciliaiton by public discussion, *Advances in Cryptology—Eurocrypt'93, Lecture Notes in Computer Science*, 410-423 (Springer-Verlag, New York, 1993).

Van Assche, G., Cardinal, J. & Cerf, N.J., Reconciliation of a quantum-distributed Gaussian key, *E-print arXiv:cs.CR*/0107030 (2002).

Maurer, U. M. & Wolf, S., Information theoretic key agreement : from weak to strong secrecy for free, *Advances in Cryptology—Eurocrypt 2000, Lecture Notes in Computer Science*, 351-368 (Springer-Verlag, New York, 2000).

Maurer, U.M., Secret key agreement by public discussion from common information, *IEEE Trans. Inform. Theory* 39, 733-742 (1993).

Bennett, C. H., Brassard, G., Crépeau, C. & Maurer, U.M., Generalized privacy amplifiction, *IEEE Trans. on Inform. Theory* 41, 1915-1935 (1995).

Carter, J.L. & Wegman, M.N., Universal Classes of Hash Functions, *J. of Comp. and Syst. Sci.* 18, 143-154 (1979).

Schönhage, A., Schnelle Multiplikation von Polynomen über Körpern der Charakteristik 2, *Acta Informatica* 7, 395-398 (summary in English) (1977).

Brent, R.P. Larvala, S. & Zimmermann, P., A fast algorithm for testing irreductibility of trinomials mod 2, *Tech. Rep., Oxford University Computing Laboratory*, 1-16 (2000).

Braunstein, S.L. & Pati, A.K., Quantum information with continuous variables, table of contents, Kluwer Academic, Dordrecht, 2003.

Stucki, D., Gisin, N., Guinnard, O., Ribordy, G. & Zbinden H., Quantum Key Distribution over 67 km with a plug&play system, *E-print arXiv:quant-ph*/0203118 (2002).

Buttler, W.T., Lamoreaux, S.K., Torgerson, J.R., Nickel, G.H., Donahue, C.H., & Peterson, C.G., Fast, efficient error reconciliation for quantum cryptography. *E-print arXiv:quant-ph*/0203096 (2003).

Grosshans F., Van Assche G., Wenger J., Brouri R., Cerf N. J. & Grangier Ph., Quantum key distribution using gaussian-modulated coherent states, *Nature* 421, 238-241 (2003).

Tittle et al., "Quantum Cryptography," *Physics World*, 41-45 (Mar. 1998).

* cited by examiner

HIGH-RATE QUANTUM KEY DISTRIBUTION SCHEME RELYING ON CONTINUOUSLY PHASE AND AMPLITUDE-MODULATED COHERENT LIGHT PULSES

RELATED APPLICATIONS

This patent application takes priority from U.S. Provisional Application No. 60/394,330, filed on Jul. 5, 2002, which is hereby incorporated by reference.

FIELD OF THE INVENTION

The present invention is related to the distribution of a random bit string between two authorised parties, for use as a secret key in a secure i.e., encrypted and authenticated communication.

The key distribution uses quantum carriers, typically single-photon or strongly attenuated pulses, for encoding the key bits. It is supplemented with classical post-processing algorithms, namely reconciliation and privacy amplification algorithms, in order to distil the secret key.

The Heisenberg uncertainty principle of quantum mechanics, together with the use of a privacy amplification protocol, guarantees that an unauthorised third party (any eavesdropper) cannot gain any information on the secret key.

STATE OF THE ART

Quantum key distribution (QKD), usually known as quantum cryptography, is presently the most advanced application of quantum communication. QKD has been proposed in 1984 by C. H. Bennett and G. Brassard as a technique for distributing a secret key, i.e., a random bit string, between two authorised parties that relies on quantum mechanics. This secret key, also called symmetric key, can then be used by the parties to transmit a confidential message by use of a standard cryptographic method such as the Vernam code, which is unconditionally secure. It can also be used to authenticate the communication, i.e., distinguish legitimate messages from fake ones.

Quantum key distribution requires a quantum channel supplemented with a (classical) authenticated public channel. Typically, a sequence of light pulses is sent in the quantum channel, encoding each a key bit. The quantum properties of light, in particular the Heisenberg uncertainty principle, ensure that no information can be gained on these key bits without disturbing the quantum state of the photons. Public communications over the classical channel are then used to estimate the maximum amount of information that a potential eavesdropper may have acquired, and distil a secret key out of the raw data.

Several practical schemes for quantum key distribution have been proposed and implemented over the last ten years. The present state-of-the-art quantum cryptographic schemes make use of a binary encoding of the key using ideally single-photon states, or, in practice, very faint coherent states containing on average a fraction of a photon per pulse. The secret key rate is limited due to the need for photon-counting detectors, which have a relatively low maximum repetition frequency in order to keep the detector's afterpulse probability negligible. In addition, the range over which the security is guaranteed is limited by a threshold on the quantum bit error rate, which is reached above a certain attenuation (beyond a certain range) as a consequence of the detector's dark counts. A review of quantum cryptography can be found in ref.[1].

Another potential implementation of QKD that was raised very recently consists in using quantum continuous variables (QCV)[29], such as the electric field amplitudes, to obtain possibly more efficient alternatives to usual photon-counting QKD techniques.

Many recent proposals[2-10] to use QCV for QKD have been made that are based on the use of "non-classical" light beams, namely squeezed light or entangled light beams ("EPR beams"). In contrast, embodiments of the present invention discuss the use of "quasi-classical" (coherent) light beams. U.S. Pat. No. 5,515,438, hereby incorporated by reference, describes a quantum key distribution using non-orthogonal macroscopic signals.

SUMMARY OF CERTAIN ASPECTS OF THE INVENTION

Embodiments of the present invention are a potential alternative to the usual single-photon quantum cryptographic techniques devised so far. Key carriers used are quasi-classical (coherent) light pulses that contain many photons and are continuously modulated in amplitude and phase[11]. The continuous raw data is then converted into a usable binary key using a continuous reconciliation protocol[9,22]. In contrast to previous proposals, this shows that there is no need for squeezed light in the context of QCV QKD: an equivalent level of security may be obtained simply by generating and transmitting continuous distributions of coherent states, an easier task compared to generating squeezed states or single-photon states.

More specifically, embodiments of the present invention distribute secret keys at a high rate over long distances. A protocol uses shot-noise limited coherent (homodyne) detection, which works at much higher repetition frequencies than single-photon detectors, so that high secret-bit rates can indeed be achieved. It remains, in principle, secure for very lossy transmission lines by use of a reverse reconciliation algorithm, so it may therefore be used over long distances.

One further goal of the invention is to demonstrate the practicability of the QCV QKD protocol when using Gaussian-modulated coherent states that are laser pulses containing several photons. The scope of the invention is not restricted to Gaussian distributions (other continuous distributions may be used as well) but this makes the demonstration easier. Embodiments of the invention cover the security analysis of the protocol and a proof-of-principle experimental implementation, followed by the complete secret key extraction, including data reconciliation and privacy amplification. The tested set-up yields a secret key rate of approximately 1.7 Mbps for a lossless line and of 75 kbps for a 3.1 dB line.

Embodiments of this invention describe the distribution of a secret key between two remote parties by use of quantum coherent states, e.g., attenuated laser pulses, that are continuously modulated in phase and amplitude. Coherent (homodyne) detection is then performed by the receiver in order to measure the quadrature components of these states.

One protocol embodiment of the invention ensures that the information a potential eavesdropper may gain at most can be estimated from the measured parameters characterising the channel (line attenuation and error rate). Using an authenticated public (classical) channel, the resulting raw data (partly correlated continuous variables) can be converted into a secret binary key by using a (direct or reverse) reconciliation protocol supplemented with privacy amplification. The resulting key can then be used as a private key in order to ensure the confidentiality and/or authentication of a transmission using standard cryptographic techniques.

Aspects of the quantum continuous-variable cryptographic scheme include the continuous distribution of coherent states. This is in contrast with all other schemes, which rely on a binary encoding. Here, the encoding of continuous variables into the quadrature components of a coherent state makes it possible to encode several key bits per coherent pulse. Also, the use of homodyne detection techniques to measure the quadrature components of the light field allows this scheme to work at high frequencies by comparison with photon-counting techniques.

Other aspects of the scheme include the use of a continuous reconciliation protocol in order to convert the raw key resulting from the first item into a usable binary key. A direct or reverse reconciliation protocol may be used depending on the line parameters. For lines with an attenuation that exceeds 3 dB, reverse reconciliation must be used in order to ensure the security. There is, in principle, no limit on the achievable range using reverse reconciliation, but practical considerations (noise in the apparatuses, in particular in the coherent detection system, non-unity efficiency of the reconciliation protocols) put a limit on the range over which the key can be securely distributed. For very noisy lines with low losses, direct reconciliation is preferred.

In one embodiment of the present invention there is a quantum cryptographic system, comprising at least one sending unit comprising an encoder and distributing a raw key in the quadrature components of quantum coherent states that are continuously modulated in phase and amplitude; at least one receiving unit comprising a homodyne detector of the quantum coherent states in order to measure the quadrature components of the states; a quantum channel for connecting the sending unit to the receiving unit; and a two-way authenticated public channel for transmitting non-secret messages between the sending unit and the receiving unit.

According to one embodiment, the quantum cryptographic system further comprises a continuous-variable quantum key distribution protocol ensuring that the amount of information a potential eavesdropper may gain at most on the sent and received data can be estimated from the measured parameters of the quantum channel (error rate and line attenuation).

The sent and received raw data resulting from the continuous-variable protocol are converted into a secret binary key by using a continuous reconciliation protocol supplemented with privacy amplification.

According to one embodiment, the encoder of the quadrature components with a high signal-to-noise ratio encodes several key bits per coherent light pulse.

According to another embodiment, the decoding of the quadrature components of the light field via the homodyne detector achieves high secret bit rates in comparison to photon-counting techniques.

In case of noisy quantum channels with low losses, the continuous reconciliation protocol is a direct reconciliation protocol, which allows the receiver to discretize and correct its data according to the sent values.

In case of quantum channels with an attenuation that exceeds 3 dB, the continuous reconciliation protocol is a reverse reconciliation protocol, which allows the sending unit to discretize and correct its data according to the values measured by the receiver.

The key secret can be used as a private key for ensuring confidentiality and authentication of a cryptographic transmission.

According to one embodiment, the quadrature components of the quantum coherent states are modulated with a Gaussian distribution, the coordinate values of the center of the Gaussian distribution being arbitrary.

According to another embodiment, the variance of the Gaussian distribution for the quadrature X is different from the variance of the Gaussian distribution for the conjugate quadrature P.

According to another embodiment, the Gaussian-modulated coherent sates are attenuated laser light pulses typically containing several photons.

The information, an eavesdropper may gain on the sent and received Gaussian-distributed values, can be calculated explicitly using Shannon's theory for Gaussian channels.

In another embodiment of the present invention there is a method of distributing continuous quantum key between two parties which are a sender and a receiver, the method comprising selecting, at a sender, two random numbers $x_A$ and $p_A$ from a Gaussian distribution of mean zero and variance $V_A N_0$, where $N_0$ refers to the shot-noise variance; sending a corresponding coherent state $|x_A + ip_A\rangle$ in the quantum channel; randomly choosing, at a receiver, to measure either quadrature x or p using homodyne detection; informing the sender about the quadrature that was measured so the sender may discard the wrong one; measuring channel parameters on a random subset of the sender's and receiver's data, in order to evaluate the maximum information acquired by an eavesdropper; and converting the resulting raw key in the form of a set of correlated Gaussian variables into a binary secret key comprising direct or reverse reconciliation in order to correct the errors and get a binary key, and privacy amplification in order to make secret the binary key.

The reconciliation can produce a common bit string from correlated continuous data, which comprises the following: transforming each Gaussian key element of a block of size n by the sender into a string of m bits, giving m bit strings of length n, referred to as slices; converting, by the receiver, the measured key elements into binary strings by using a set of slice estimators; and sequentially reconciliating the slices by using an implementation of a binary error correction algorithm, and communicating on the public authenticated channel.

The post-processing of privacy amplification can comprise distilling a secret key out of the reconciliated key by use of a random transformation taken in a universal class of hash functions.

Informing the sender can comprise utilizing a public authenticated channel by the receiver to inform the sender. The channel parameters can include an error rate and a line attenuation.

In another embodiment of the present invention there is a device for implementing a continuous-variable quantum key exchange, the device comprising a light source or a source of electromagnetic signals configured to generate short quantum coherent pulses at a high repetition rate; an optical component configured to modulate the amplitude and phase of the pulses at a high frequency; a quantum channel configured to transmit the pulses from an emitter to a receiver; a system that permits the transmission of a local oscillator from the emitter to the receiver; a homodyne detector capable of measuring, at a high acquisition frequency, any quadrature component of the electromagnetic field collected at the receiver's station; a two-way authenticated public channel that is used to communicating non-secret messages in postprocessing protocols; and a computer at the emitter's and receiver's stations that drives or reads the optical components and runs the postprocessing protocols.

Alternatively, a local oscillator can be transmitted together with the signal by use of a polarization encoding system whereby each pulse comprises a strong local oscillator pulse and a weak orthogonally-polarized signal pulse with modulated amplitude and phase.

If polarization encoding is used, the receiving system relies on polarization-mode homodyne detection requiring a quarter-wave plate and a polarizing beam splitter.

In another embodiment of the present invention, there is a device for exchanging Gaussian key elements between two parties which are a sender and a receiver, the device comprising a laser diode associated with a grating-extended external cavity, the laser diode configured to send light pulses at a high repetition rate, each pulse typically containing several photons; an integrated electro-optic amplitude modulator and a piezoelectric phase modulator, configured to generate randomly-modulated light pulses, the data being organized in bursts of pulses; a beam-splitter to separate the quantum signal from a local oscillator; and a homodyne detector combining the quantum signal and local oscillator pulses in order to measure one of the two quadrature components of the light field.

The device may further comprise an acquisition board and a computer on the sender's and receiver's sides in order to run the post-processing protocols described here above.

The laser can operate at a wavelength comprised between about 700 and about 1600 nm, or the laser can operate at a wavelength comprising telecom wavelengths between about 1540 and 1580 nm.

The device may additionally comprise means for selecting, at the emitter, two random numbers $x_A$ and $p_A$ from a Gaussian distribution of mean zero and variance $V_A N_0$, where $N_0$ refers to the shot-noise variance; means for sending a corresponding coherent state $|x_A+ip_A\rangle$ in the quantum channel; means for randomly choosing, at the receiver, to measure either quadrature x or p using homodyne detection; means for informing the emitter about the quadrature that was measured so the emitter may discard the wrong one; means for measuring channel parameters on a random subset of the emitter's and receiver's data, in order to evaluate the maximum information acquired by an eavesdropper; and means for converting the resulting raw key in the form of a set of correlated Gaussian variables into a binary secret key comprising direct or reverse reconciliation in order to correct the errors and get a binary key, and privacy amplification in order to make secret the binary key.

DESCRIPTION OF CERTAIN EMBODIMENTS OF THE PRESENT INVENTION

One realisation of this quantum cryptographic scheme consists in modulating the quadrature components of coherent light pulses with a Gaussian distribution. The corresponding protocol is demonstrated in what follows. Dealing with Gaussian distributions makes the security of the entire protocol easier to analyse, but the scope of the present invention is not limited to such random distributions. Alternative continuous distributions may be used as well. Other improvements of the present invention can be foreseen, such as the use of more efficient reconciliation protocols that may potentially increase the achievable range.

The protocol described herein works by continuously modulating the phase and amplitude of coherent light pulses and measuring the quadrature components of the received coherent states. This clearly gives very important practical advantages to such a protocol, in view of the simplicity of the techniques needed to preparing and detecting coherent states. In particular, the high dimensionality of the phase space may be exploited by modulating the phase and amplitude quadratures with a large dynamics, allowing the encoding of several key bits per pulse. This, together with the fact that fast modulation and detection can be achieved, results in a high-rate secret key distribution.

This protocol, supplemented with a direct reconciliation scheme, can be shown to be secure provided that the transmission of the line is larger than 50%, i.e., the transmission loss is less than 3 dB[11]. This is in accordance with the fact that QKD fundamentally relies on the use of non-orthogonal states only and may perfectly well work with macroscopic signals instead of single photons (see U.S. Pat. No. 5,515, 438). The security of the protocol is related to the no-cloning theorem[12-14], and non-classical features like squeezing or EPR correlations have no influence on the achievable secret key rate. The 3 dB loss limit of these protocols makes the security demonstration quite intuitive, but there may exist in principle multiple ways for two user/partners, e.g., Alice and Bob, to go beyond this limit, for instance by using QCV entanglement purification[15].

The concept of reverse reconciliation, detailed below, is an efficient technique to cross this 3 dB limit that does not require the generation and purification of entanglement, but only a modified classical post-processing. The corresponding coherent-state protocol can, in principle, be secure for any value of the line transmission[18,32]. There is therefore no theoretical limit on the achievable range over which security can be guaranteed. In addition, it can be shown that the cryptographic security is strongly linked with entanglement, even though the protocol does not rely on entanglement.

Figure 1:
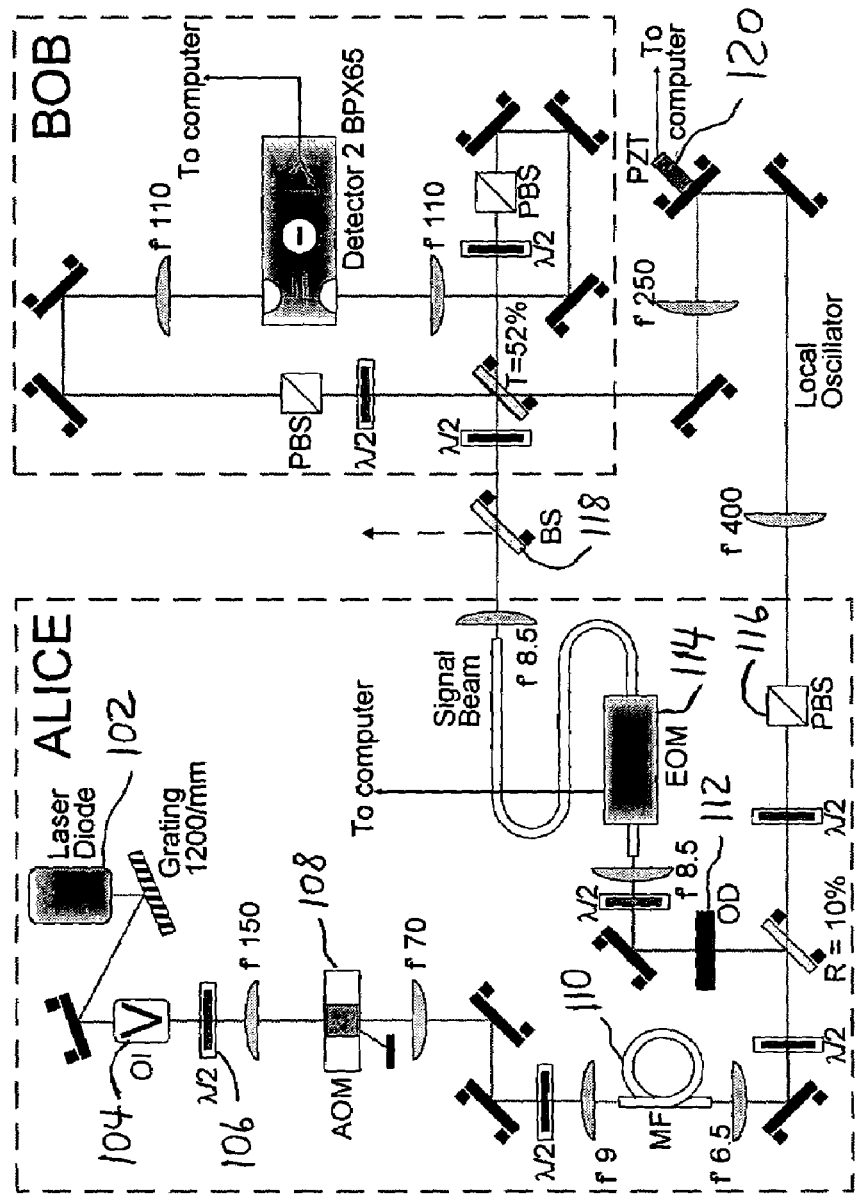
FIG. 1 is a diagram of one configuration of components demonstrating embodiments of the present invention.

Referring to FIG. 1, a configuration of components demonstrating embodiments of the present invention will be described. The components are partitioned into exemplary use by two users, Alice and Bob. The components include the following: Laser diode 102: e.g., SDL 5412 lasing at 780 nm; OI 104: e.g., optical isolator; λ/2 106: e.g., half-wave plate; AOM 108: e.g., acousto-optic modulator; MF 110: e.g., polarization maintaining monomode fibre; OD 112: e.g., optical density (attenuator); EOM 114: e.g., integrated LiNbO$_3$ electro-optic amplitude modulator; PBS 116: e.g., polarizing beam splitter; BS 118: e.g., beam splitter inducing variable attenuation; and PZT 120: e.g., piezo-electric transductor. The lenses are marked with a "f" followed by their focal lengths in millimeters. R and T are reflection and transmission coefficients.

The basic idea behind reverse reconciliation is to interchange the roles of Alice and Bob when converting the measured data into a common binary key, that is, Alice attempts to guess what was received by Bob rather than Bob guessing what was sent by Alice. Consequently, Alice always has an advantage over a potential eavesdropper, Eve, as the latter only has a noisy estimate of Alice's data at their disposal in order to guess Bob's data. This is, roughly speaking, the mechanism that ensures the security of these new protocols.

In the description below, the concept of coherent-state QKD supplemented with reverse reconciliation is introduced and then an individual attack using an entangling cloner is described. An explicit expression of the maximum achievable secret key rate is deduced. A table-top experiment that generates streams of data corresponding to the protocol will be described. Although Alice and Bob are not fully separated in the present implementation, the data are created by the same physical process and thus have the same structure as they would have in a real cryptographic exchange. Explicitly how to process the experimental data to extract the secret key will be demonstrated, that is, reverse reconciliation and privacy amplification protocols is performed. Finally, a quantitative evaluation of the expected performances of the scheme in a realistic key exchange is given.

Coherent-State Quantum Key Exchange and Reconciliation Protocols

In a QKD protocol such as BB84, Alice and Bob randomly choose one out of two complementary bases for respectively preparing and measuring a quantum signal, so their data are significant only when their bases are compatible. After this quantum exchange, they thus have to agree on a common basis and discard the wrong measurements. According to the present invention, we make use of a coherent-state protocol that extends this principle to QCV and runs as follows[11]. First, Alice draws two random numbers $x_A$ and $p_A$ from a Gaussian distribution of mean zero and variance $V_A N_0$, where $N_0$ denotes the shot-noise variance, and then she sends to Bob the coherent state $|x_A+ip_A\rangle$. Next, Bob randomly chooses to measure either the quadrature x or p. Then, using a public authenticated channel, he informs Alice about the quadrature that he measured so she may discard the wrong one. After running this protocol several times, Alice and Bob (and possibly the eavesdropper Eve) share a raw key, that is, a set of correlated Gaussian variables that are called key elements. After this quantum exchange, Alice and Bob must convert this raw key into a binary secret key by proceeding with the various steps described below including channel evaluation, direct or reverse reconciliation (to correct the errors and make the key binary), and privacy amplification (to make the key secret).

Channel Evaluation

First, Alice and Bob openly compare a sample of their key elements over the classical public channel in order to evaluate the error rate and transmission efficiency of the quantum channel. The sacrificed key elements must be chosen randomly and uniformly, so that they are representative of the whole sequence, and are unknown in advance to Eve. Knowing the correlations between their key elements, Alice and Bob can then evaluate the amount of information they share ($I_{AB}$) as well as the information that Eve can have about their values ($I_{AE}$ and $I_{BE}$).

The estimated amount of eavesdropped information has some significance later on, in the privacy amplification procedure, when Eve's knowledge is destroyed. Indeed, it is known that Alice and Bob can in principle distil a secret key with a size S>sup($I_{AB}-I_{AE}$, $I_{AB}-I_{BE}$) bits per key element[24]. Thus, if S>0, they can extract a common key from their correlated key elements by performing one-way classical communication over a public authenticated channel, revealing as little information as possible to Eve. There are actually two main options for doing this key extraction that are closely related to the above expression for S, namely performing either direct or reverse reconciliation.

Direct Reconciliation (DR)

Alice publicly sends correction information, revealing R bits, so Bob corrects his key elements to have the same values as Alice. At the end of this step, Alice and Bob have a common bit string of length $I_{AB}$+R, and Eve knows $I_{AE}$+R bits of this string (slightly more if the reconciliation protocol is not perfect). Therefore Alice and Bob get a useable secret key if ($I_{AB}-I_{AE}$)>0 at the beginning. We call this "direct reconciliation" (DR) because the classical information flow has the same direction as the initial quantum information flow. Direct reconciliation is quite intuitive, but it is not secure as soon as the quantum channel efficiency falls below 50%[11]. It may prove useful, however, for very noisy low-loss quantum channels.

Reverse Reconciliation (RR)

Alternatively, in a reverse reconciliation protocol, Bob publicly sends correction information and Alice corrects her key elements to have the same values as Bob. Since Bob gives the correction information, this reconciliation keeps ($I_{AB}-I_{BE}$) constant, and provides a useable key if ($I_{AB}-I_{BE}$)>0. We call this "reverse reconciliation" (RR) because Alice needs to estimate what will be measured by Bob. Such a procedure is actually closer, in spirit, to single-photon QKD as there Bob simply communicates to Alice the time slots where he did not detect a photon (Alice thus reconciliates her data with Bob's measured values).

Privacy Amplification

The last step of a practical QKD protocol consists in Alice and Bob performing privacy amplification to filter out Eve's information. This can be done by properly mixing the reconciliated bits so as to spread Eve's uncertainty over the entire final key as described above. This procedure requires having an estimate of the amount of information collected by Eve on the reconciliated key, so we need to have a bound on $I_{AE}$ for DR or on $I_{BE}$ for RR. In addition, Alice and Bob must keep track of the number of bits exchanged publicly during reconciliation since Eve might have monitored them. This knowledge is destroyed at the end of the privacy amplification procedure, reducing the key length by the same amount. For a coherent state protocol, the DR bound on $I_{AE}$ given in 1 leads to a security limit for a 50% line transmission as mentioned above. The RR bound on $I_{BE}$, is now established and shown that it is not associated with a minimum value of the line transmission.

Eavesdropping Strategy Based on an Entangling Cloner

In order to eavesdrop a reverse reconciliation scheme, Eve needs to guess the result of Bob's measurement without superimposing too much noise on Bob's data. We will call "entangling cloner"[18,32] a system allowing her to do so. Such a cloner creates two quantum-correlated copies of Alice's quantum state, so Eve simply keeps one of them and sends the other one to Bob. Let ($x_{in}$, $p_{in}$) be the input field quadratures of the entangling cloner, and ($x_B,p_B$), ($x_E,p_E$) the quadratures of Bob's and Eve's output fields. To be safe, Alice and Bob must assume Eve uses the best possible entangling cloner knowing Alice-Bob's channel quality: Eve's cloner should minimise the conditional variances[16-17] $V(x_B|x_E)$ and $V(p_B|p_E)$, i.e., the variance of Eve's estimates of Bob's field quadratures ($x_B,p_B$). As described above, these variances are constrained by Heisenberg-type relations, which limit what can be obtained by Eve, $$V(x_B|x_A)V(p_B|p_E) \geq N_0^2 \text{ and } V(p_B|p_A)V(x_B|x_E) \geq N_0^2 \quad (1)$$

where $V(x_B|x_A)$ and $V(p_B|p_A)$ denote Alice's conditional variances. This means that Alice and Eve cannot jointly know more about Bob's conjugate quadratures than allowed by the Heisenberg principle, even if they conspire together. As we shall see, Alice's conditional variances can be bounded by using the measured parameters of the quantum channel, which in turn makes it possible to bound Eve's variance. Here, the channel is described by the linearized relations $x_B = \sqrt{G_x}(x_{in}+B_x)$ and $p_B = \sqrt{G_p}(p_{in}+B_p)$, with $\langle x_{in}^2 \rangle = \langle p_{in}^2 \rangle = VN_0 \geq N_0$, $\langle B_{x,p}^2 \rangle = \chi_{x,p} N_0$, and $\langle x_{in} B_x \rangle = \langle p_{in} B_p \rangle = 0$. The quantities $\chi_x, \chi_p$ represent the channel noises referred to its input, also called equivalent input noises[16-17], while $G_x$, $G_p$ are the channel gains for x and p ($G_{x,p}<1$ for a lossy transmission line), and V is the variance of Alice's field quadratures in shot-noise units ($V = V_A + 1$).

Now comes the crucial point of the demonstration. The output-output correlations of the entangling cloner, described by $V(x_B|x_E)$ and $V(p_B|p_E)$, should only depend on the density matrix $D_{in}$ of the field ($x_{in}, p_{in}$) at its input, and not on the way Alice produced this field namely whether it is a Gaussian mixture of coherent states or one of two EPR-correlated beams. Inequalities (1) thus have to be fulfilled for every physically allowed values of $V(x_B|x_A)$ and $V(p_B|p_A)$ given $D_{in}$. If we look for a bound to Eve's knowledge by using (1), we have thus to use the smallest possible value for $V(x_B|x_A)$ and $V(p_B|p_A)$ given $D_{in}$. In particular, we must assume that Alice uses EPR beams to maximise her knowledge of Bob's results, even though she does not do so in practice. The two-mode squeezing (or entanglement) that Alice may use is, however, bounded by the variance of her field V, which in turn implies a limit on how well Alice can know Bob's signal as described above:

$$V(p_B|p_A) \geq G_p(\chi_p + V^{-1})N_0 \text{ and } V(x_B|x_A) \geq G_x(\chi_x + V^{-1}) N_0 \quad (2)$$

These lower bounds may be compared with the actual values if Alice sends coherent states, that is, $V(x_B|x_A)_{coh} = G_x(\chi_x + 1)N_0$ and $V(p_B|p_A)_{coh} = G_p(\chi_p + 1)N_0$. Nevertheless, if we look for an upper bound on Eve's knowledge by using (1), we need to use the pessimistic limits given by (2), which implies $$V(x_B|x_E) \geq N_0/\{G_p(\chi_p + V^{-1})\} \text{ and } V(p_B|p_E) \geq N_0/\{G_x(\chi_x + V^{-1})\} \quad (3)$$

It is worthwhile asking whether Eve can reach these bounds. In a practical QKD scheme, Alice and Bob will give the same roles to x and p, and Bob will randomly choose one of them, as explained above. Assuming therefore that $G_x = G_p = G$ and $\chi_x = \chi_p = \chi$, the two bounds of (3) reduce to $V(B|E) \geq N_0/\{G(\chi + V^{-1})\}$. An entangling cloner achieving this limit can be sketched as follows. Eve uses a beamsplitter with a transmission $G<1$ to split up a part of the signal transmitted from Alice to Bob, and she injects into the other input port a field $E_m$ that will induce a noise with the appropriate variance at Bob's end. In order to fully control this field $E_m$, Eve will inject one of two EPR-correlated beams, and she will keep the second one until Alice and Bob have revealed their bases. This ensures Eve is maximally entangled with Bob's field, compatible with the noise observed by Bob (this is an "entangling" attack). A straightforward calculation[18] shows that such an entangling cloner does reach the lower limit of (3).

Security Condition and Secret Bit Rate for a Reverse Reconciliation Protocol

In a reverse quantum cryptography protocol, Eve's ability to infer Bob's measurement is limited by the inequalities (3) and one must assume that a "perfect" Eve is able to reach these limits. In order to estimate the limits on information rates, we use Shannon's theory for Gaussian additive-noise channels (Shannon). The information shared by Alice and Bob is given by the decrease of Bob's field entropy that comes with the knowledge of Alice's field, i.e., $I_{AB} = H(B) - H(B|A)$. For a Gaussian distribution, the entropy is given, up to a constant, by $H(B) = (1/2)\log_2(V_B)$ bits per symbol, where $V_B$ is the variance. For simplicity, we assume here that the channel gains and noises, and the signal variances are the same for x and p. In practice, deviations from this should be estimated by statistical tests). Thus, according to Shannon's formula, the information rates $I_{BA}$ and $I_{BE}$ are given by:

$$I_{BA} = (1/2)\log_2[V_B/(V_{B|A})_{coh}] = (1/2)\log_2[(V+\chi)/(1+\chi)] \quad (4a)$$

$$I_{BE} = (1/2)\log_2[V_B/(V_{B|E})_{min}] = (1/2)\log_2[G^2(V+\chi)(V^{-1}+\chi)] \quad (4b)$$

where $V_B = \langle x_B^2 \rangle = \langle p_B^2 \rangle = G(V+\chi)N_0$ is Bob's variance, $(V_{B|E})_{min} = V(x_B|x_E)_{min} = V(p_B|p_E)_{min} = N_0/\{G(\chi + V^{-1})\}$ is Eve's minimum conditional variance, and $(V_{B|A})_{coh} = V(x_B|x_A)_{coh} = V(p_B|p_A)_{coh} = G(\chi + 1)N_0$ is Alice's conditional variance for a coherent-state protocol. The secret information rate for such a reverse reconciliation protocol is thus[18,32]

$$\Delta I_{RR} = I_{BA} - I_{BE} = -(1/2)\log_2[G^2(1+\chi)(V^{-1}+\chi)] \quad (5)$$

and the security is guaranteed ($\Delta I > 0$) provided that $G^2(1+\chi)(V^{-1}+\chi) < 1$. For a direct reconciliation protocol, a similar calculation gives $\Delta I_{DR} = I_{AB} - I_{AE} = (1/2)\log_2[(V+\chi)/(1+V\chi)]$ so the security is guaranteed if $\chi < 1$. The equivalent input noise $\chi$ includes two contributions: one is the "vacuum noise" due to the losses along the line, given by $\chi_{vac} = (1-G)/G$. The noise above vacuum noise, which we call "excess noise", is defined as $\epsilon = \chi - \chi_{vac} = \chi - (1-G)/G$. In the limit of high losses ($G \ll 1$) one has $\Delta I_{RR} \approx -(1/2)\log_2[1+G(2\epsilon + V^{-1} - 1)]$, and thus the protocol will be secure provided that $\epsilon < (V-1)/(2V) \sim 1/2$. Therefore RR may indeed be secure for any value of the line transmission G provided that the amount of excess noise $\epsilon$ is not too large. This is an important difference with DR, which may tolerate large excess noise but requires low line losses since we have the conditions $G > 1/2$ and $\epsilon < (2G-1)/G$.

It should be emphasised that squeezing and entanglement do play a crucial role in the security demonstration, even though we deal with a coherent state protocol. This is because the bound on $I_{BA}$ is obtained by assuming that Alice may use squeezed or entangled beams, and the bound on $I_{BE}$ can be achieved only if Eve uses an entangling attack. Therefore, though we did not consider the most general situation of a collective and/or non-Gaussian attack on the whole key exchange between Alice and Bob, we can reasonably conjecture that the security proof encompasses all eavesdropping strategies.

Detailed Description of an Experimental Optical Set-Up

Figure 2:
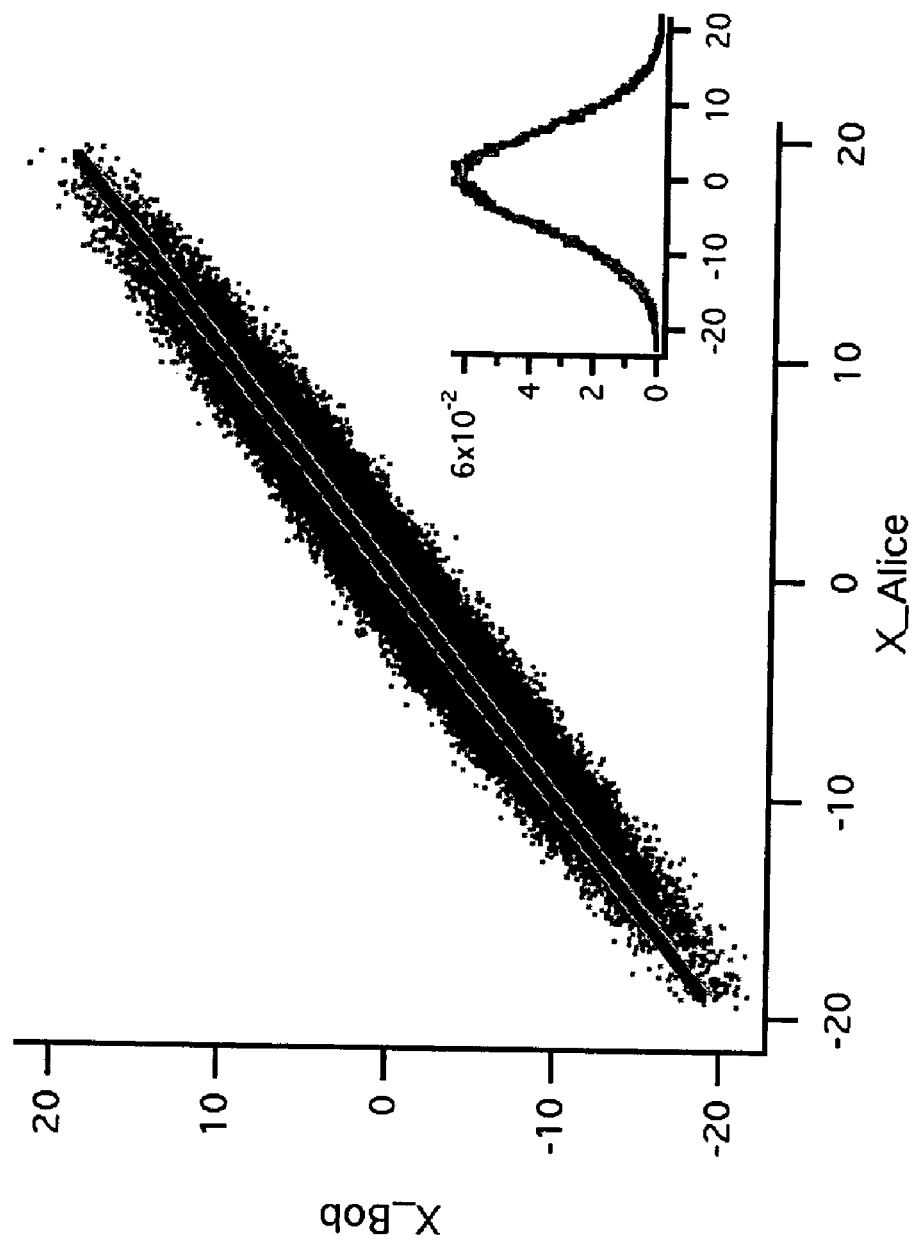
FIG. 2 is a diagram representing Bob's measured values of the quadrature component as a function of Alice's sent values (in Bob's measurement basis) for a burst of 60,000 pulses exchanged between Alice and Bob in the configuration shown in FIG. 1.

In order to exchange correlated sets of Gaussian variables with Bob, Alice sends randomly modulated light pulses of 120 ns duration at a 800 kHz repetition rate. Each pulse contains up to 250 photons, and Bob performs an homodyne measurement of either x or p, using local oscillator (LO) pulses, containing about $10^8$ photons, that are also transmitted to him. One configuration of an experimental set-up[32] is shown on FIG. 1. The channel losses are simulated by inserting a variable attenuator between Alice and Bob. FIG. 2 shows a data burst of 60,000 pulses measured by Bob, as a function of the amplitude sent by Alice in Bob's measurement basis. The line transmission is 100% and the modulation variance is V=41.7. The solid line is the theoretical prediction (slope equal to one), and the insert shows the corresponding histograms of Alice's (gray curve) and Bob's (black curve) data.

Referring again to FIG. 1, the laser source 102 consists of a commercially available CW laser diode (SDL 5412) at 780 nm associated with an acousto-optic modulator 108, that is used to chop pulses with a duration 120 ns (full width half-maximum), at a repetition rate 800 kHz. In order to reduce excess noise, a grating-extended external cavity is used, and the beam is spatially filtered using a polarisation maintaining single mode fibre 110. Light pulses are then split onto a 10% reflecting beam-splitter, one beam being the local oscillator (LO), the other Alice's signal beam. The data is organised in bursts of 60000 pulses, separated by time periods that are used to lock the phase of the LO and sequences of pulses to synchronise the parties. In the present experiment, there is a burst every 1.6 seconds, which corresponds to a duty cycle of about 5%, but this should be easy to improve.

The desired coherent state distribution is generated by Alice by modulating randomly both the amplitude and phase of the light pulses with the appropriate probability law. In the present experiment, the amplitude of each pulse is arbitrarily modulated at the nominal 800 kHz rate. However, due to the unavailability of a fast phase modulator at 780 nm, the phase is not randomly modulated but scanned continuously from 0 to $2\pi$ using a piezoelectric modulator 120. For such a determinist phase variation, the security of the protocol is of course not warranted and thus no genuine secret key can be distributed. However, the experiment provides realistic data, that will have exactly the awaited structure provided that random phase permutation on Bob's data are performed. The amplitude modulator 114 is an integrated electro-optic $LiNbO_3$ Mach-Zehnder interferometer, allowing for small voltages inputs ($V_\pi$=2.5V) at 780 nm. All voltages for the electro-optic modulator 114 or the piezoelectric transductor 120 are generated by an acquisition board (National Instruments PCI6111E) connected to a computer. Though all discussions assume the modulation to be continuous, digitised voltages are obviously used in practice. With the experimental parameters, a resolution of 8 bits is enough to hide the amplitude or phase steps under shot noise. Since the modulation voltage is produced using a 16 bits converter, and the data is digitised over 12 bits, we may fairly assume the modulation to be continuous. Due to an imbalance between the paths of the interferometer, the modulator extinction is not strictly zero. In the present experiment that is only aimed at a proof of principle, the offset field from the data received by Bob is subtracted. In a real cryptographic transmission, the offset field should be compensated by Alice, either by adding a zeroing field, or by using a better modulator. For each incoming pulse, either the x or p signal quadrature is measured by appropriate switching of the LO phase. The homodyne detection was checked to be shot-noise limited for LO power up to $5\times10^8$ photons/pulse. The overall homodyne detection efficiency is 0.76, due to the optical transmission (0.9), the mode-matching efficiency (0.92) and the photodiode quantum efficiency (0.92).

The experiment is thus carried out in such a way that all useful parameters—such as photon numbers, signal to noise ratios, added noises, information rate, etc.—can be measured experimentally. Reconciliation and privacy amplification protocols can thus be performed in realistic—though not fully secret—conditions. The limitations of the present set-up are essentially due to the lack of appropriate fast amplitude and phase modulator at 780 nm. This should be easily solved by operating at telecom wavelengths (1540-1580 nm) where such equipment is readily available.

Figure 3:
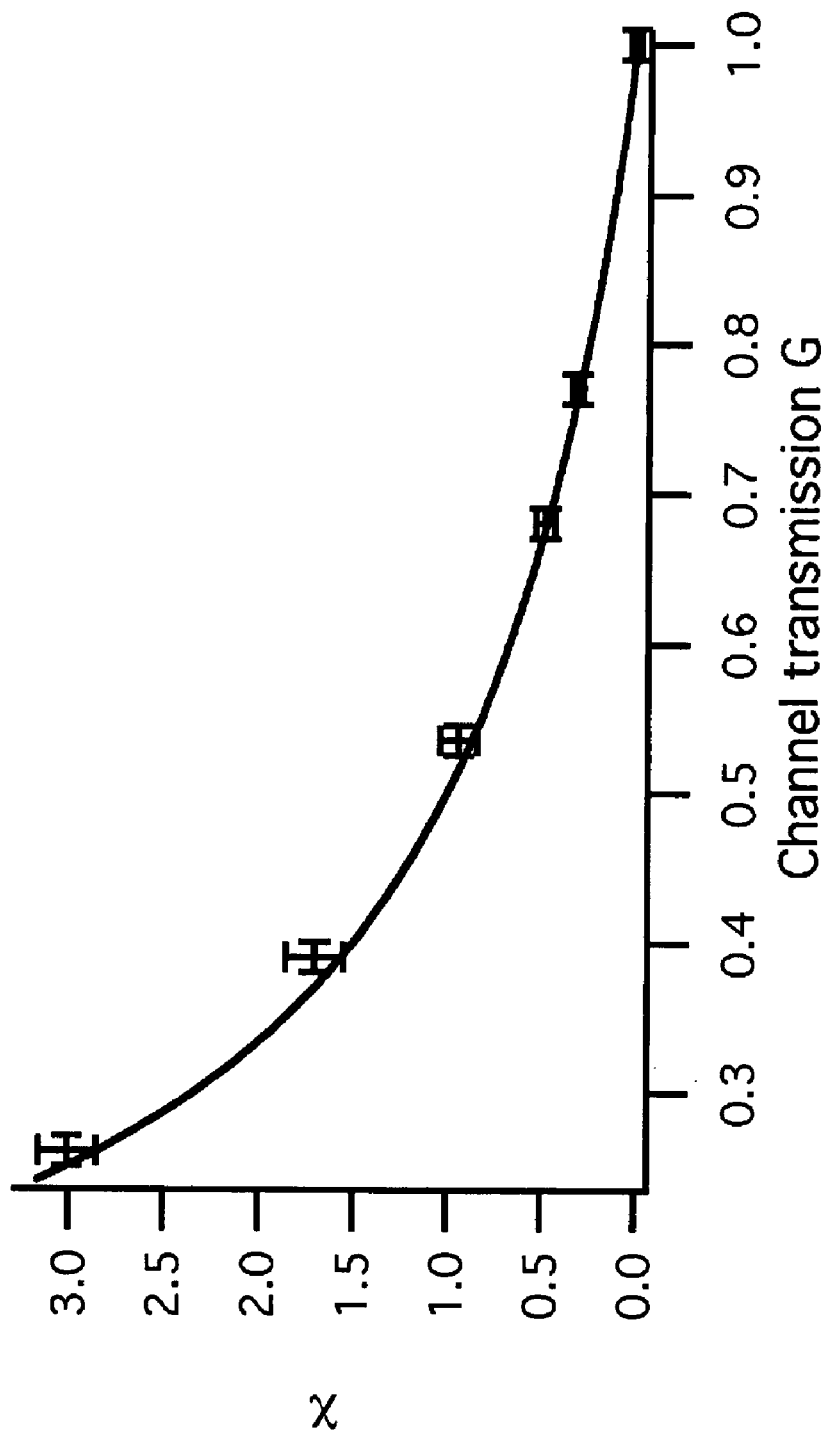
FIG. 3. is a diagram representing the channel equivalent noise χ as a function of the channel transmission G, adjusted using a variable attenuator on the signal line.

Referring to FIG. 3, the curve is the theoretical prediction $\chi_{vac}$=(1−G)/G. The error bars include two contributions with approximately the same size, from statistics (evaluated over bursts of 60,000 pulses) and systematics (calibration errors and drift). After the quantum exchange, Alice and Bob evaluate the total added noise by calculating the variance of the difference between their respective values. This variance has four contributions: the shot noise $N_0$, the channel noise $\chi N_0$, the electronics noise of Bob's detector ($N_{el}$=0.26$N_0$), and the noise due to imperfect homodyne detection efficiency ($N_{hom}$=0.32$N_0$). In the absence of line losses, the measured $\chi$ is (0.01+0.04), while it is expected to be zero. This is attributed to various calibration errors and drifts in the set-up, and gives an idea of the experimental uncertainty in the evaluation of the channel noise. In presence of line losses, the measured $\chi$ increases as (1−G)/G as expected, see FIG. 3.

Figure 4:
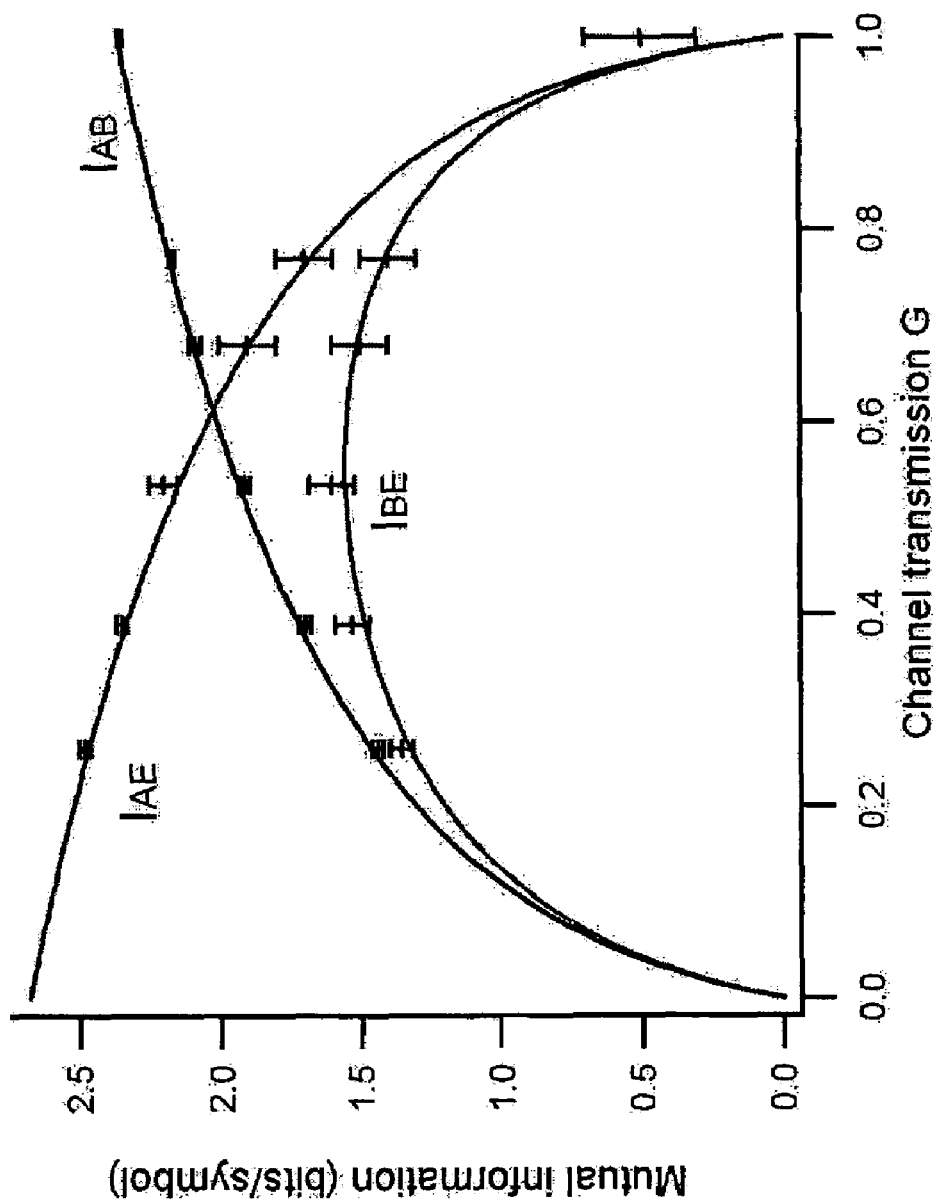
FIG. 4 is a diagram representing the values of $I_{BA}$ (increasing curve), $I_{AE}$ (decreasing curve), $I_{BE}$ (inverse U-shaped curve) as a function of the channel transmission G for V≈40.

Referring to FIG. 4, the value of $I_{BE}$ is calculated by assuming that Eve cannot know the noises $N_{el}$ and $N_{hom}$, which are internal to Bob's detector. This corresponds to a "realistic" hypothesis, where the noise of Bob's detector is not controlled by Eve. The theoretical value of $I_{AE}$ is also plotted in order to compare RR with DR.

The detection noises $N_{el}$ and $N_{hom}$ originate from Bob's detection system only, so one may reasonably assume that they do not contribute to Eve's knowledge. In this "realistic" approach, $I_{BE}$ is given by Eq. (4b) with % being the channel noise (i.e., subtracting the detection noises). In FIG. 4, $I_{BE}$ is plotted together with the value of $I_{BA}$ as given by Eq. (4a), where $\chi$ is now the total equivalent noise including both transmission and detection. The difference between these two curves gives the achievable secret key rate in reverse reconciliation $\Delta I_{RR}$ as a function of the line transmission G. We also show Alice-Eve information $I_{AE}$=($\frac{1}{2}$)$\log_2$[(V+$\chi^{-1}$)/(1$\chi^{-1}$)], corresponding to a direct reconciliation protocol[11], with $\chi$ being the channel noise. The comparison of the DR and RR protocols is straightforward by looking at FIG. 4.

Computer Simulation of the Secret Key Distillation

One aspect in the protocol is to design a (direct or reverse) reconciliation algorithm that can efficiently extract a binary common key from the measured data. A computer program that performs the various steps of secret key distillation described above, namely channel evaluation, reconciliation, and privacy amplification[32] was written. Under the scope of this "proof-of-principle" experiment, Alice and Bob are simulated on the same computer, although it poses no fundamental problem to make them remotely communicate over a network. This would require the use of a classical public authenticated channel in addition to the quantum channel. The designed program accepts as input the sequences of Alice's sent values and Bob's measurement outcomes, and produces a secret key as detailed below. First, Alice's and Bob's key elements are compared in order to measure the relevant parameters of the quantum channel, namely the overall transmission G and added noise $\chi$. The estimation of Eve's knowledge is based on Eq. (4), that gives a bound on $I_{BE}$ once G and $\chi$ are known to Alice and Bob. Then, a reconciliation algorithm is performed, with as few leaked bits to Eve as possible. Protocols based on discrete quantum states such as BB84[20] can use a discrete reconciliation protocol, for example Cascade[21]. In contrast, since continuous key elements are produced here, we instead needed to develop a "sliced" reconciliation algorithm[9,22], which produces a common bit string from correlated continuous key elements as described above. Finally, we carry out privacy amplification in such a way that, loosely speaking, every bit of the final key is a function of most if not all of the reconciliated bits. Following[23-25], we can reduce the size of the key by ($nI_{BE}$+r+ $\Delta(n)$) bits, where r indicates the public information leaked during the reconciliation of the sequence of size n, and $\Delta(n)$ is an extra security margin as described above. This follows from the assumption that Eve can only use individual attacks, so that we can consider key elements and eavesdropping as independent repetitions of identical random processes.

Demonstration of Relevant Heisenberg Relations

Let us consider the situation where Alice tries to evaluate $x_B$, and Eve tries to evaluate $p_B$ in a reverse reconciliation protocol. The corresponding estimators can be de noted as $\alpha x_A$ for Alice and $\beta p_E$ for Eve, where $\alpha$ and $\beta$ can be taken as real numbers. The errors for these estimators will be $x_{B|A}$, $\alpha = x_B - \alpha x_A$, and $p_{B|E,\beta} = p_B - \beta p_E$. Since all operators for Alice, Bob and Eve commute, one has obviously $[x_{B|A,\alpha}, p_{B|E,\beta}] = [x_B, p_B]$ and thus we get the Heisenberg relation $\Delta x_{B|A,\alpha}^2 \Delta p_{B|E,\beta}^2 \geq N_0^2$. Since the conditional variances are by definition given by $V(x_B|x_A) = \min_\alpha \{\Delta x_{B|A,\alpha}^2\}$ and $V(p_B|p_E) = \min_\beta \{\Delta p_{B|E,\beta}^2\}$, we obtain the expected relation $V(x_B|x_A)V(p_B|p_E) \geq N_0^2$. Exchanging the roles of x and p, one gets also the symmetrical relation $V(p_B|p_A)V(x_B|x_E) \geq N_0^2$.

Alice has the estimators $(x_A, p_A)$ for the field $(x_{in}, p_{in})$ that she sends out, so that one can write $x_{in} = x_A + A_x$ and $p_{in} = p_A + A_p$ with $<A_x^2> = <A_p^2> = sN_0$, where s is related to the amount of squeezing that may be used by Alice to generate this field, and obeys $s \geq V^{-1}$. By calculating the correlation coefficients $<p_A^2> = (V-s)N_0$, $<p_B^2> = G_p(V+\chi_p)$ $N_0$, and $<p_A p_B> = \sqrt{G_p} <p_A^2>$, one obtains Alice's conditional variance on Bob's measurement, $V(p_B|p_A) = <p_B^2> - |<p_A p_B>|^2/<p_A^2> = G_p(s+\chi_p)N_0$. This equation and the constraint $s > V^{-1}$ gives finally $V(p_B|p_A) \geq G_p(V^{-1}+\chi_p)N_0$, and similarly $V(x_B|x_A) \geq G_x(V^{-1}+\chi_x)N_0$ by exchanging the roles of x and p.

Detailed Description of Sliced Reconciliation

We assume that Alice and Bob share correlated Gaussian key elements from which they wish to extract I(A; B) common bits, where A (resp. B) denotes the random variable representing one of Alice's (resp. Bob's) Gaussian key elements, described using their binary expansion. In order to deal with realistic streams of data despite the non-random phase modulation used in the current experiment, the key elements must actually be randomly permuted before processing. The reconciliation procedure[9,22] works in the following way. Alice chooses m functions $S_1(A), \ldots, S_m(A)$ that map her key elements onto $\{0, 1\}^m$. If Alice and Bob exchanged a block of n key elements $A_1, \ldots, A_n$, Alice thus creates m bit strings of length n, called "slices", by applying each function $S_i$ to all her key elements: $S_1(A_1), \ldots, S_i(A_n)$. Then Alice and Bob reconcile each slice sequentially for i=1 . . . n. Since this comes down to reconciling bit strings, we used an implementation[19] of the binary error correction algorithm Cascade[21]. Bob, on his side, must also convert his key elements $B_1, \ldots, B_n$ into binary strings. To this end, he uses another set of functions $R_i$, called "slice estimators", which estimate the bits $S_i(A)$ given Bob's current knowledge. Since the slices are corrected sequentially for i=1, . . . , m, Bob already knows $S_1(A), \ldots, S_{i-1}(A)$ upon correcting slice i, so that the slice estimator $R_i$ is a function of B and of the previous reconciliated slices, that is $R_i(B; S_1(A), \ldots, S_{i-1}(A))$. It remains to detail how the functions $S_i$ are created. On the one hand, we wish to extract as many bits as possible out of A and B, but, on the other hand, any bit leaked during the binary reconciliation with Cascade does not count as a secret bit since it is publicly known. The difference between these two quantities defines the net amount of (potentially secret) reconciliated bits per key element, which can be expressed as $H(S_1(A), \ldots, S_m(A)) - \Sigma_i h(e_i)$, where the first term is the entropy of the Alice's produced bits, and $e_i = \Pr[R_i(B; S_1(A), \ldots, S_{i-1}(A)) \neq S_i(A)]$. This uses the fact that, according to Shannon theory, at least n h(e) bits must be disclosed to correct a string of length n with bit error probability e, where $h(x) = -x \log_2 x - (1-x)\log_2(1-x)$. Note that in practice Cascade leaks a little bit more than Shannon's formula. In the case of the current set-up, it appeared useless to reconcile the bits beyond some precision level, so we chose to use m=5 slices as a trade-off between a satisfactory number of reconciliated bits and reasonable computing resources. We discretized the field amplitudes into $2^m = 32$ intervals, numbered from 0 to 31. What was found to work best[22] is to assign the least significant bit of the interval number to $S_1(A)$, the second least significant bit to $S_2(A)$, and so on, up to the most significant bit to $S_5(A)$. In other words, the reconciliation is carried out from a fine-grained level to a coarse-gained level. We then numerically optimized the interval boundaries so as to maximise the net amount of reconciliated bits. It should be stressed that the binary error correction algorithm used in this implementation, Cascade[21], is a two-way interactive protocol, so that the information leaking to Eve should be estimated carefully. For example, in RR, Eve may gain some knowledge on Alice's value that might give her some additional information on the key (Bob's value). The same problem occurs in DR, but to a smaller extent. This additional information, which reduces the number of secret bits, must be evaluated numerically[32].

Detailed Description of Privacy Amplification

Privacy amplification amounts to process the reconciliated key into a random transformation taken in a universal class of hash functions[25,26]. In this case, we chose the class of truncated linear functions in a finite field. This means we considered the reconciliated bits as coefficients of a binary polynomial in a representation of the Galois field $GF(2^{110503})$ whose size allows to process up to 110503 bits at once, and hashing was achieved by first multiplying the reconciliated polynomial with a random element of the field and then extracting the desired number of least significant bits[32]. This operation can be implemented efficiently (see e.g.[27]). In practice, the explicit knowledge of a prime polynomial over GF(2) is needed to perform the modular reduction, so we used the polynomial[28] $x^{110503} + x^{519} + 1$. Finally, the number of extracted bit is n $H(S_1(A), \ldots, S_m(A)) - I(A;E) - r - \Delta(n)$, where we reduced the final key size by some extra amount $\Delta(n)$, which depends on the actual number of key elements and the desired security margin. The evaluation of $\Delta(n)$, which is basically a finite size effect, will not be described here.

Evaluation of the Proposed QKD Schemes

Table 1 shows the ideal and practical secret key rates of the direct-reconciliation and reverse-reconciliation QKD protocols for several values of the line transmission G. The RR scheme is in principle efficient for any value of G, provided that the reconciliation protocol achieves the limit given by $I_{BA}$. However, in practice, unavoidable deviations of the algorithm from Shannon's limit reduce the actual reconciled information shared by Alice and Bob, while $I_{BE}$ is of course assumed unaffected. For high modulation (V≈40), the reconciliation efficiency lies around 80%, which makes it possible to distribute a secret key at a rate of several hundreds of kbits per second for low losses. However, the achievable reconciliation efficiency drops when the signal-to-noise ratio (SNR) decreases, so that no secret bits can be extracted when the channel gain G is too low. This can be improved by reducing the modulation variance, which increases the ratio $I_{BA}/I_{BE}$ so the constraint on the reconciliation efficiency is less severe. Although the ideal secret key rate is then lower, we could process the data with a reconciliation efficiency of 78% for G=0.49 (3.1 dB) and V=27, resulting in a net key rate of 75 kbits/s. This clearly demonstrates that RR continuous-variable protocols operate efficiently at and beyond the 3 dB loss limit of DR protocols. We emphasize that, although we were not able to extract a key well above 3 dB in this "proof-of-principle" experiment, an increase of the reconciliation efficiency would immediately translate into a larger achievable range.

The QCV protocol can be compared with single-photon protocols on two aspects: the raw repetition frequency and the secret key rate in bits per time slot. In photon-counting QKD, the key rate is intrinsically limited by the maximum repetition frequency of the single-photon detector, typically of the order of 100 kHz, due to the lifetime of trapped charges in the semiconductor. In contrast, homodyne detection may run at frequencies of up to tens of MHz. In addition, a specific advantage of the high dimensionality of the QCV phase space is that the field quadratures can be modulated with a large dynamics, allowing the encoding of several key bits per pulse. Very high secret bit rates are therefore attainable with the coherent-state protocol when using transmission lines of low losses (up to about 3 dB in the present implementation). For high-loss transmission lines, the protocol is presently limited by the reconciliation efficiency, but its intrinsic performances remain very high. Let us consider an ideal situation where the reconciliation algorithm attains Shannon's bound and the excess noise is negligible. Then, the net key rate of the protocol is slightly above that of BB84, which yields $G\, n_{ph}/2$ secret bits per time slot for a noiseless line, where $n_{ph}$ is the number of photons sent per time slot. Taking for instance a 67.1 km line (typical current distance for state-of-the-art single-photon QKD[30]) with 14.3 dB loss and a reasonable modulation V=10, the protocol would ideally yield a secret key rate of 0.025 bits per time slot. Thus, assuming perfect reconciliation and a pulse repetition rate of a few MHz, the QCV protocol could achieve a secret key rate as high as 100 kbits/sec. Note, however, that $I_{BA}$=0.208 bits per time slot in this case, so that a reconciliation efficiency of about 90% would actually be needed in a regime of very low (around −5 dB) signal-to-noise ratio. The currently available reconciliation protocols do not reach this regime. For comparison, the secret key rate of BB84 with an ideal single-photon source and perfect detectors would be at best 0.019 bits per time slot with the same line, and even one order of magnitude smaller using attenuated light pulses with $n_{ph}$=0.1.

This application incorporates by reference the subject matter as was originally filed, a portion of which was excised to meet PTO publication requirements.

Although the present "proof-of-principle" setup is far from reaching these numbers, there is still a considerable margin for improvement, both in the hardware and the software. For example, working at telecom wavelengths where fast modulators are available would overcome some of the technical limitations of the present set-up. Concerning the receiver's system, increasing the detection bandwidth or the homodyne efficiency, and decreasing the electronic noise would significantly enhance the achievable range. Also, significant improvement may result from further research on reconciliation algorithms[31]. This suggests that the way is open for testing the present proposal as a practical, high bit-rate, quantum key distribution scheme over moderate distances.

TABLE 1

| V | G (%) | Losses (dB) | Ideal RR rate (kb/s) | Practical RR rate (kbs/s) | Ideal DR rate (kb/s) | Practical DR rate (kb/s) |
|---|---|---|---|---|---|---|
| 41.7 | 100 | 0.0 | 1,920 | 1,690 | 1,910 | 1,660 |
| 38.6 | 79 | 1.0 | 730 | 470 | 540 | 270 |
| 32.3 | 68 | 1.7 | 510 | 185 | 190 | — |
| 27.0 | 49 | 3.1 | 370 | 75 | 0 | — |
| 43.7 | 26 | 5.9 | 85 | — | 0 | — |

Table 1 summarizes the parameters of the quantum key exchange for several values of the line transmission G (the corresponding losses are given in dB). The variations of Alice's field variance V are due to different experimental adjustments. The ideal secret key bit rates would be obtained from the measured data with perfect key distillation, yielding exactly $I_{BA}$-$I_{BE}$ bits (RR) or $I_{AB}$-$I_{AE}$ (DR). The practical secret key bit rates are the one achieved with the current key distillation procedure ("−" means that no secret key is generated). Both bit rates are calculated over bursts of about 60,000 pulses at 800 kHz, not taking into account the duty cycle (≈5%) in the present setup.

The invention claimed is:

1. A quantum cryptographic system comprising:
   a sending unit comprising an encoder and configured to distribute a raw key in the quadrature components of quantum coherent states by modulating the quantum coherent states with a continuous distribution in phase and amplitude;
   a receiving unit comprising a homodyne detector of the quantum coherent states configured to measure the quadrature components of the states and to receive the raw key;
   a quantum channel for connecting the sending unit to the receiving unit; and
   a two-way authenticated public channel for transmitting non-secret messages between the sending unit and the receiving unit.

2. The quantum cryptographic system of claim 1, further comprising a continuous-variable quantum key distribution protocol ensuring that the amount of information a potential eavesdropper may gain at most on the sent and received data can be estimated from the measured parameters of the quantum channel (error rate and line attenuation).

3. The quantum cryptographic system of claim 2, wherein the raw key resulting from the continuous-variable protocol is converted into a secret binary key by using a continuous reconciliation protocol supplemented with privacy amplification.

4. The quantum cryptographic system of claim 3, wherein the continuous reconciliation protocol is a direct reconciliation protocol, which allows the receiver to discretize and correct its data according to the sent values.

5. The quantum cryptographic system of claim 3, wherein the continuous reconciliation protocol is a reverse reconciliation protocol, which allows the sending unit to discretize and correct its data according to the values measured by the receiver.

6. The quantum cryptographic system of claim 3, wherein the secret key is used as a private key for ensuring confidentiality and authentication of a cryptographic transmission.

7. The quantum cryptographic system of claim 1, wherein the encoder of the quadrature components is configured to encode a plurality of key bits per coherent light pulse.

8. The quantum cryptographic system of claim 1, wherein the quadrature components of the quantum coherent states are modulated with a Gaussian distribution.

9. The quantum cryptographic system of claim 8, wherein the coordinate values of the center of the Gaussian distribution are arbitrary.

10. The quantum cryptographic system of claim 8, wherein the variance of the Gaussian distribution for the quadrature X is different from the variance of the Gaussian distribution for the conjugate quadrature P.

11. The quantum cryptographic system of claim 8, wherein the Gaussian-modulated coherent states are attenuated laser light pulses.

12. The quantum cryptographic system of claim 11, wherein the information an eavesdropper may gain on the sent and received Gaussian-distributed values are calculated explicitly using Shannon's theory for Gaussian channels.

13. A method of distributing continuous quantum key between two parties which are a sender and a receiver, the method comprising:
    selecting, at a sender, two random numbers $x_A$ and $p_A$ from a Gaussian distribution of mean zero and variance $V_A N_0$, where $N_0$ refers to the shot-noise variance;
    sending a corresponding coherent state $|x_A+ip_A\rangle$ in the quantum channel;
    randomly choosing, at a receiver, to measure either quadrature x or p using homodyne detection;
    informing the sender about the quadrature that was measured so the sender may discard the quadrature x or p that was not measured;
    measuring channel parameters on a random subset of the sender's and receiver's data, in order to evaluate the maximum information acquired by an eavesdropper; and
    converting the resulting raw keys which is in the form of a set of correlated Gaussian variables, into a binary secret key, the converting comprising:
        direct or reverse reconciliation in order to correct errors and to get a binary key, and
        privacy amplification in order to make secret the binary key.

14. The method of claim 13, wherein the reconciliation produces a common bit string from correlated continuous data, the reconciliation comprising:
    transforming each Gaussian key element of a block of size n by the sender into a string of m bits, giving m bit strings of length n, referred to as slices;
    converting, by the receiver, the measured key elements into binary strings by using a set of slice estimators; and
    sequentially reconciling the slices by using an implementation of a binary error correction algorithm, and communicating on the public authenticated channel.

15. The method of claim 13, wherein the post-processing of privacy amplification comprises distilling a secret key out of the reconciled key by use of a random transformation taken in a universal class of hash functions.

16. The method of claim 13, wherein informing the sender comprises utilizing a public authenticated channel by the receiver to inform the sender.

17. The method of claim 13, wherein the channel parameters include an error rate and a line attenuation.

18. The method of claim 13, wherein the sending comprises sending the corresponding coherent state $|x_A+ip_A\rangle$ that is continuously modulated in phase and amplitude in the quantum channel.

19. A device for implementing a continuous-variable quantum key exchange, the device comprising:
    a light source or a source of electromagnetic signals configured to generate short quantum coherent pulses;
    an optical component configured to modulate with a continuous distribution the amplitude and phase of the pulses;
    a quantum channel configured to transmit the pulses from an emitter to a receiver;
    a system that permits the transmission of a local oscillator pulse from the emitter to the receiver;
    a homodyne detector capable of measuring any quadrature component of the electromagnetic field collected at the receiver's station;
    a two-way authenticated public channel that is used to communicate non-secret messages in postprocessing protocols; and
    a computer at the emitter's and receiver's stations that drives or reads the optical components and runs the postprocessing protocols.

20. The device of claim 19, wherein a local oscillator pulse is transmitted together with the signal pulse into one pulse by use of a polarization encoding system whereby each of the one pulse comprises a relatively stronger local oscillator pulse and a relatively weaker orthogonally-polarized signal pulse with modulated amplitude and phase.

21. The device of claim 20, wherein if polarization encoding is used, the receiving system relies on polarization-mode homodyne detection requiring a quarter-wave plate and a polarizing beam splitter.

22. The device of claim 19, additionally comprising:
    means for selecting, at the emitter, two random numbers $x_A$ and $p_A$ from a Gaussian distribution of mean zero and variance $V_A N_0$, where $N_0$ refers to the shot-noise variance;
    means for sending a corresponding coherent state $|x_A+ip_A\rangle$ in the quantum channel;
    means for randomly choosing, at the receiver, to measure either quadrature x or p using homodyne detection;
    means for informing the emitter about the quadrature that was measured so the emitter may discard the quadrature x or p that was not measured;
    means for measuring channel parameters on a random subset of the emitter's and receiver's data, in order to evaluate the maximum information acquired by an eavesdropper; and
    means for converting the resulting raw key, in the form of a set of correlated Gaussian variables, into a binary secret key, the converting comprising direct or reverse reconciliation in order to correct errors and to get a binary key, and privacy amplification in order to make secret the binary key.

23. The device of claim 19, wherein the light source or the source of electromagnetic signals comprises the light source or the source of electromagnetic signals configured to generate short quantum coherent pulses that contain a plurality of photons and that are modulated with a continuous distribution in phase and amplitude.

24. A device for exchanging Gaussian key elements between two parties, which are a sender and a receiver, the device comprising:
    a laser diode associated with a grating-extended external cavity, the laser diode configured to send light pulses, each pulse containing a plurality of photons, each pulse being modulated with a continuous distribution in phase and amplitude;

an integrated electro-optic amplitude modulator and a piezoelectric phase modulator, configured to generate randomly-modulated light pulses, the data being organized in bursts of pulses;

a beam-splitter to separate the quantum signal from a local oscillator pulse; and a homodyne detector combining the quantum signal and local oscillator pulses in order to measure one of the two quadrature components of the light field.

25. The device of claim 24, further comprising an acquisition board and a computer on the sender's and receiver's sides in order to run post-processing protocols.

26. The device of claim 24, wherein the laser operates at a wavelength between about 700 and about 1600 nm.

27. The device of claim 24, wherein the laser operates at a wavelength comprising telecom wavelengths between about 1540 and about 1580 nm.

28. The method of claim 24, wherein each light pulse sent by the laser diode contains a plurality of photons and is continuously modulated in phase and amplitude.

* * * * *

UNITED STATES PATENT AND TRADEMARK OFFICE
CERTIFICATE OF CORRECTION

PATENT NO. : 7,403,623 B2
APPLICATION NO. : 10/615490
DATED : July 22, 2008
INVENTOR(S) : Cerf et al.

It is certified that error appears in the above-identified patent and that said Letters Patent is hereby corrected as shown below:

On Page 2, second Column, Line 16, please delete "reconciliaiton" and insert -- reconciliation --, therefor.

On Page 2, second Column, Line 28, please delete "amplifiction," and insert -- amplification, --, therefor.

On Page 2, second Column, Line 36, please delete "irreductibility" and insert -- irreducibility --, therefor.

In Column 8, Line 41 (approx.), please delete "in 1" and insert -- in $^{11}$ --, therefor.

In Column 10, Line 52, please delete "a" and insert -- an --, therefor.

In Column 10, Line 53, please delete "an" and insert -- a --, therefor.

In Column 17, Line 2, in Claim 9, please delete "coordinate" and insert -- co-ordinate --, therefor.

In Column 17, Line 33, in Claim 13, please delete "keys" and insert -- key, --, therefor.

Signed and Sealed this

Twenty-second Day of September, 2009

David J. Kappos
*Director of the United States Patent and Trademark Office*